(12) United States Patent
Tanda (10) Patent No.: US 11,435,117 B2
(45) Date of Patent: Sep. 6, 2022

(54) AIR-CONDITIONING APPARATUS

(71) Applicant: Mitsubishi Electric Corporation, Tokyo (JP)

(72) Inventor: Tsubasa Tanda, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 297 days.

(21) Appl. No.: 16/637,864

(22) PCT Filed: Oct. 10, 2017

(86) PCT No.: PCT/JP2017/036634
§ 371 (c)(1),
(2) Date: Feb. 10, 2020

(87) PCT Pub. No.: WO2019/073517
PCT Pub. Date: Apr. 18, 2019

(65) Prior Publication Data
US 2020/0248915 A1  Aug. 6, 2020

(51) Int. Cl.
*F25B 13/00* (2006.01)
*F24F 11/64* (2018.01)
*F24F 11/30* (2018.01)
*F24F 11/61* (2018.01)
*F24F 1/30* (2011.01)
*F25B 30/02* (2006.01)
(Continued)

(52) U.S. Cl.
CPC .............. *F25B 13/00* (2013.01); *F24F 1/30* (2013.01); *F24F 11/30* (2018.01); *F24F 11/61* (2018.01);
(Continued)

(58) Field of Classification Search
CPC .. F24F 11/30; F24F 11/61; F24F 11/62; F24F 11/64; F24F 11/84; F24F 1/30;
(Continued)

(56) References Cited

U.S. PATENT DOCUMENTS 4,010,623 A * 3/1977 Kaschak ................... F17C 6/00
141/82
2005/0086951 A1 * 4/2005 Dobmeier ............. F25B 49/005
62/131
(Continued)

FOREIGN PATENT DOCUMENTS

EP  3 062 041 A1  8/2016
GB  2553972 A  3/2018
(Continued)

OTHER PUBLICATIONS

Office Action dated Aug. 27, 2021, issued in corresponding CN Patent Application No. 201780095067.X (and English Machine Translation).
(Continued)

*Primary Examiner* — Kidest Bahta
(74) *Attorney, Agent, or Firm* — Posz Law Group, PLC (57) ABSTRACT

An air-conditioning apparatus includes a refrigerant circuit in which a compressor, a flow passage switching device, an outdoor heat exchanger, an indoor heat exchanger, a refrigerant container, a first expansion device and a second expansion device connected by pipes, wherein the indoor heat exchanger and the outdoor heat exchanger have inner volumes satisfying a relationship of an inner volume of the indoor heat exchanger<an inner volume of the outdoor heat exchanger, and a controller which, performs control so as to allow the flow passage switching device to switch the flow passage to the heating flow passage and allow an opening degree of the second expansion device to be larger than that of the first expansion device, starts the compressor, performs control so as to allow the opening degrees of the first expansion device and the second expansion device to be initial opening degrees for the cooling operation.

6 Claims, 6 Drawing Sheets

(51) Int. Cl.
*F25B 49/02* (2006.01)
*G05B 19/042* (2006.01)
*F25B 41/34* (2021.01)
*F25B 41/24* (2021.01)
*F25B 41/39* (2021.01)

(52) U.S. Cl.
CPC .............. *F24F 11/64* (2018.01); *F25B 30/02* (2013.01); *F25B 41/24* (2021.01); *F25B 41/34* (2021.01); *F25B 41/39* (2021.01); *F25B 49/022* (2013.01); *G05B 19/042* (2013.01); *G05B 2219/25252* (2013.01); *G05B 2219/2614* (2013.01)

(58) Field of Classification Search
CPC .............. F25B 13/00; F25B 2313/0292; F25B 2500/26; F25B 2500/28; F25B 2600/01; F25B 2600/2513; F25B 30/02; F25B 41/24; F25B 41/34; F25B 41/39; F25B 49/02; F25B 49/022; G05B 19/042; G05B 2219/2525; G05B 2219/2614
See application file for complete search history.

(56) References Cited

U.S. PATENT DOCUMENTS

2011/0005270 A1* 1/2011 Yoshimi ................ F25B 13/00
62/512

2016/0146521 A1* 5/2016 Tomita ................ F25B 49/022
62/190

FOREIGN PATENT DOCUMENTS

| JP | 2001174091 A | 6/2001 |
|----|--------------|--------|
| JP | 2001-355933 A | 12/2001 |
| JP | 2005-140433 A | 6/2005 |
| JP | 2014-129961 A | 7/2014 |
| JP | 2014-152944 A | 8/2014 |
| JP | 2015-083894 A | 4/2015 |
| WO | 2015/064172 A1 | 5/2015 |
| WO | 2017/006474 A1 | 1/2017 |

OTHER PUBLICATIONS

International Search Report of the International Searching Authority dated Jan. 16, 2018 for the corresponding International application No. PCT/JP2017/036634 (and English translation).
Office Action dated Jun. 8, 2021 issued in corresponding CN patent application No. 201780095067.X (and English translation).
Extended European Search Report dated Sep. 30, 2020 issued in corresponding European patent application No. 17928773.5.
Office Action dated Nov. 17, 2020 issued in corresponding JP patent application No. 2019-547814 (and English translation).
Chinese Office Action dated Dec. 1, 2020, Issued in corresponding CN Patent Application No. 201780095067.X (and English Machine Translation).

* cited by examiner

AIR-CONDITIONING APPARATUS

CROSS REFERENCE TO RELATED APPLICATION

This application is a U.S. national stage application of PCT/JP2017/036634 filed on Oct. 10, 2017, the contents of which are incorporated herein by reference.

TECHNICAL FIELD

The present disclosure relates to an air-conditioning apparatus. In particular, the present disclosure relates to an air-conditioning apparatus in which a heat exchanger serving as an evaporator and a heat exchanger serving as a condenser have different inner volumes.

BACKGROUND ART

A refrigeration cycle apparatus is known in which a compressor, a condenser, an expansion valve, and an evaporator are connected by refrigerant pipes to form a refrigerant circuit that allows refrigerant to circulate therein. In the refrigeration cycle apparatus, when the compressor is started and initiates driving, the refrigerant in a pipe near the evaporator is sucked into the compressor. The compressor discharges the sucked refrigerant toward the condenser. At this time, since a delay occurs in the movement of the refrigerant from the condenser to the evaporator, the amount of the refrigerant decreases transiently in a pipe near the evaporator. This lowers the suction pressure of the refrigerant. Further, in a pipe near the condenser, since the amount of the refrigerant is transiently increased, the discharge pressure of the refrigerant is increased. Here, when the inner volume of the heat exchanger serving as the evaporator and the inner volume of the heat exchanger serving as the condenser are different from each other, the change in the pressure of the refrigerant in the refrigerant circuit described above becomes more remarkable (see, for example, Patent Literature 1).

Patent Literature

Patent Literature 1: Japanese Unexamined Patent Application Publication No. 2014-129961

For example, when the inner volume of the heat exchanger as the evaporator is small, the amount of the refrigerant in the heat exchanger is insufficient. Therefore, the suction pressure of the refrigerant deviates from the driving range of the compressor. On the other hand, when the inner volume of the heat exchanger as the condenser is small, the refrigerant is excessively filled in the heat exchanger. Therefore, the discharge pressure of the refrigerant deviates from the driving range of the compressor. For the above reasons, in the refrigerant circuit, operation in a vacuum condition due to shortage of refrigerant or a pressure rise due to refrigerant overfilling is likely to occur. Therefore, damage of the compressor and the heat exchanger, abnormal stop of the unit or other problems may occur.

Summary

In order to solve the above-mentioned problem, an air-conditioning apparatus capable of preventing shortage and overfilling of refrigerant that occur in heat exchangers having different inner volumes, to thereby improve reliability, has been disclosed.

The air-conditioning apparatus of an embodiment of the present disclosure comprises a refrigerant circuit in which a compressor, a flow passage switching device, an outdoor heat exchanger, an indoor heat exchanger, a refrigerant container, a first expansion device and a second expansion device are connected by pipes; the compressor compressing and discharging sucked refrigerant, the flow passage switching device switching a flow passage to a cooling flow passage during cooling operation and to a heating flow passage during heating operation, the outdoor heat exchanger being located outside of a room and causing heat exchange to be performed with refrigerant, the indoor heat exchanger being located inside of a room and causing heat exchange to be performed between air in an air-conditioned space and the refrigerant, the refrigerant container storing excessive refrigerant, the first expansion device depressurizing the refrigerant between the outdoor heat exchanger and the refrigerant container, and the second expansion device depressurizing the refrigerant between the indoor heat exchanger and the refrigerant container, wherein the indoor heat exchanger and the outdoor heat exchanger have inner volumes satisfying a relationship of an inner volume of the indoor heat exchanger<an inner volume of the outdoor heat exchanger, and the air-conditioning apparatus further comprises a controller which is configured to, when performing the cooling operation, perform control so as to allow the flow passage switching device to switch the flow passage to the heating flow passage and allow an opening degree of the second expansion device to be larger than an opening degree of the first expansion device, and start the compressor, and when a judgment is made that a set time that is set in advance has elapsed from the start of the compressor, perform control so as to allow the opening degree of the first expansion device and the opening degree of the second expansion device to be initial opening degrees for the cooling operation.

In the present disclosure, in the air-conditioning apparatus having a relationship of the inner volume of the indoor heat exchanger<the inner volume of the outdoor heat exchanger, when performing the cooling operation, the controller, as a preliminary step, allows the flow passage switching device to switch the flow passage to the heating flow passage, and allows the opening degree of the second expansion device to be larger than the opening degree of the first expansion device, and starts the compressor, and as a result, the refrigerant is caused to flow to the indoor heat exchanger and to the inlet of the indoor heat exchanger. In this way, the shortage of the refrigerant in the indoor heat exchanger that occurs when the cooling operation is started can be eliminated, thereby improving the reliability of the air-conditioning apparatus.

DESCRIPTION OF EMBODIMENTS

Hereinafter, the air-conditioning apparatus according to embodiments of the present disclosure will be described with reference to the drawings, etc. In the following drawings, the same reference numerals denote the same or corresponding ones, and they can be applied throughout the entire document of all the embodiments described below. In addition, in the drawings, the relationship between the sizes of the components may be different from the actual ones. The configurations of the components described in the entire specification are merely examples, and the configurations of the components are not limited to those described in the specification. In particular, the combination of the components is not limited to the combination described in each embodiment, and the components described in other embodiments can be applied to other different embodiments. In addition, whether pressure and temperature are high or low are not particularly determined in relation to absolute values, and are relatively determined by the state, the operation, etc. in apparatuses or other structures. When it is not necessary to distinguish or specify a plurality of devices of the same type distinguished by using, for example, subscripts, they may often be described without using subscripts, etc.

Embodiment 1

Figure 1:
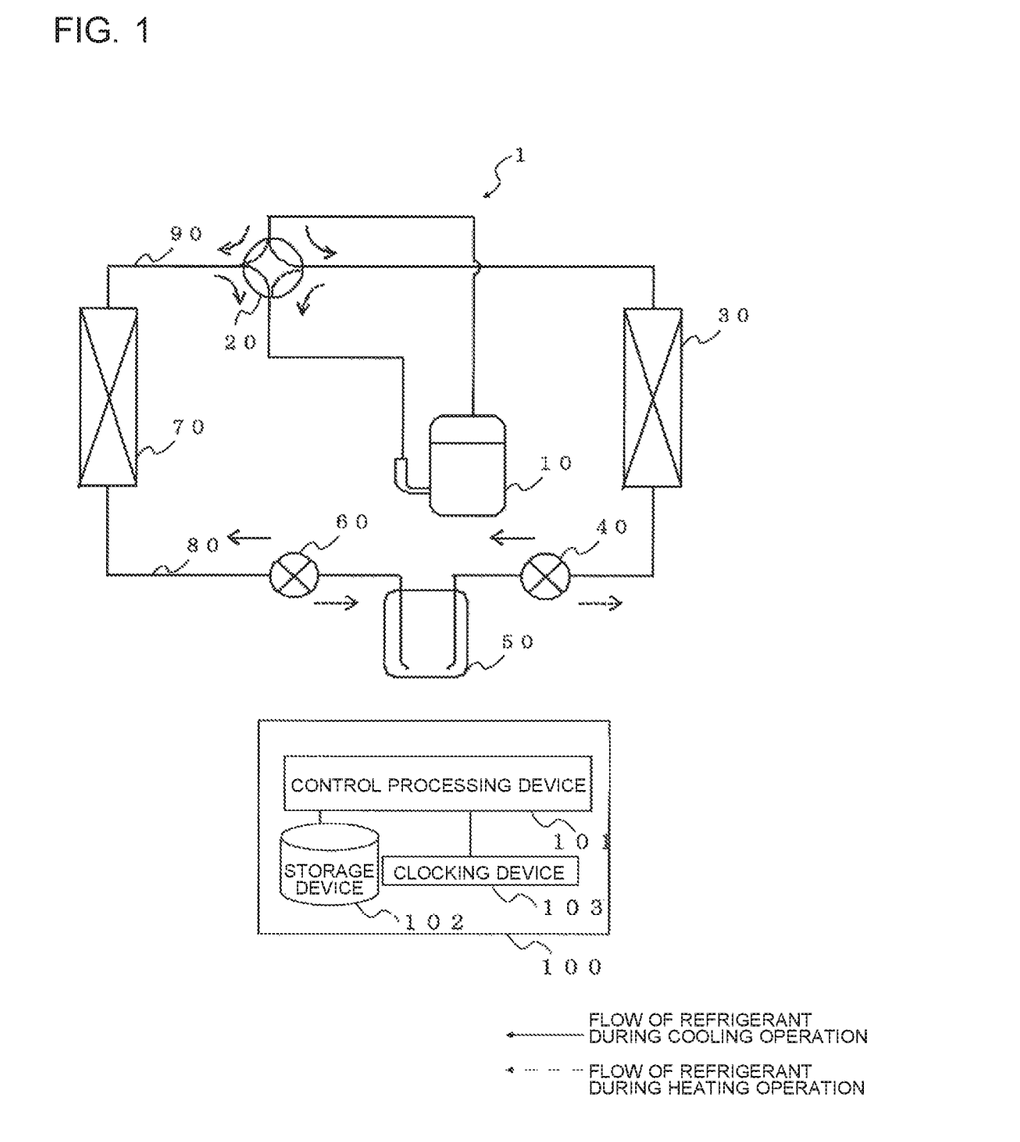
FIG. 1 is a diagram illustrating a configuration of the air-conditioning apparatus 1 according to Embodiment 1 of the present disclosure.

FIG. 1 is a diagram illustrating a configuration of the air-conditioning apparatus 1 according to Embodiment 1 of the present disclosure. The air-conditioning apparatus 1 in FIG. 1 includes a compressor 10, a four-way valve 20, an outdoor heat exchanger 30, a first expansion device 40, a refrigerant container 50, a second expansion device 60, an indoor heat exchanger 70, and a controller 100. Among them, the compressor 10, the four-way valve 20, the outdoor heat exchanger 30, the first expansion device 40, the refrigerant container 50, the second expansion device 60, and the indoor heat exchanger 70 are connected by pipes to form a refrigerant circuit. Here, in particular, a pipe connecting the second expansion device 60 and the indoor heat exchanger 70 is referred to as a first connection pipe 80. A pipe connecting the indoor heat exchanger 70 and the four-way valve 20 is referred to as a second connection pipe 90.

The compressor 10 compresses and discharges the sucked refrigerant, Although not particularly restricted, for example, the compressor 10 may be one in which the capacity of the compressor 10 (amount of refrigerant sent by the compressor per unit time) is changed by arbitrarily changing the drive frequency by an inverter circuit, etc. The four-way valve 20 is a flow passage switching device for switching the flow passage of the refrigerant in the cooling operation and the flow passage of the refrigerant in the heating operation. By switching the flow passage by the four-way valve 20, the circulation route of the refrigerant in the refrigerant circuit is changed. Here, the four-way valve 20 switches the flow passage of the refrigerant to the flow passage of the refrigerant in the heating operation when an ON signal is sent from the controller 100, and switches the flow passage of the refrigerant to the flow passage of the refrigerant in the cooling operation when an OFF signal is sent from the controller 100. Hereinafter, the flow passage of the refrigerant during the heating operation is referred to as a heating flow passage, and the flow passage of the refrigerant during the cooling operation is referred to as a cooling flow passage. The flow passage switching device is not necessarily the four-way valve 20, and may be other devices capable of switching the flow passage.

The outdoor heat exchanger 30 in Embodiment 1 exchanges heat between the refrigerant and air (outdoor air). Here, the outdoor heat exchanger 30 according to Embodiment 1 is, for example, a fin-and-tube type heat exchanger in which a plurality of heat transfer tubes penetrate orthogonally through a plurality of thin plate-like fins arranged at regular intervals. However, the outdoor heat exchanger is not limited to a fin-and-tube heat exchanger. For example, it functions as an evaporator during heating operation, and evaporates and gasifies the refrigerant. Moreover, it functions as a condenser during the cooling operation, and condenses and liquefies the refrigerant. The first expansion device 40 serves as a flow rate control device that expands the refrigerant by depressurizing. The first expansion device 40 is installed between the outdoor heat exchanger 30 and the refrigerant container 50.

The first expansion device 40 includes, for example, an electronic expansion valve that can arbitrarily change the opening degree based on instructions from the controller 100 and can adjust the refrigerant pressure, the flow rate, etc. The refrigerant container 50 is a container serving as a receiver that is disposed at a position where refrigerant in a liquid state (liquid refrigerant) flowing out from a heat exchanger as a condenser flows, and stores the liquid refrigerant as excessive refrigerant. The second expansion device 60 serves as a flow rate control device that depressurizes and expands the refrigerant. The second expansion device 60 is installed between the refrigerant container 50 and the indoor heat exchanger 70. The second expansion device 60 also includes an electronic expansion valve, for example. Although there are no particular restrictions, the first expansion device 40 and the second expansion device 60 are, for example, the same kind of electronic expansion valves which can execute the instructions for the same opening degree by the same signal.

The indoor heat exchanger 70 of Embodiment 1 causes heat exchange to be performed between refrigerant and air (air in the air-conditioned space). For example, it functions as a condenser during heating operation and condenses and liquefies the refrigerant. Further, it functions as an evaporator during cooling operation, and evaporates and gasifies the refrigerant. Here, the indoor heat exchanger 70 of Embodiment 1 is a fin-and-tube heat exchanger mentioned above. However, the heat exchanger is not limited to a fin-and-tube heat exchanger.

Here, the relationship between the outdoor heat exchanger 30 and the indoor heat exchanger 70 in Embodiment 1 will be described. In the air-conditioning apparatus 1 of Embodiment 1, the inner volume of the outdoor heat exchanger 30 is larger than the inner volume of the indoor heat exchanger 70 (the inner volume of the indoor heat exchanger 70<the inner volume of the outdoor heat exchanger 30). Specifically, the relationship is, for example, 0.4≤inner volume of indoor heat exchanger 70/inner volume of outdoor heat exchanger 30<1.0.

The controller 100 controls the air-conditioning apparatus 1. Here, the controller 100 according to Embodiment 1 includes a control processing device 101, a storage device 102, and a clocking device 103. The control processing device 101 performs processing such as calculation and judgment based on input data such as temperature, and controls the devices of the air-conditioning apparatus 1, such as the compressor 10, the four-way valve 20, the first expansion device 40, and the second expansion device 60. The storage device 102 is a device that stores data necessary for the control processing device 101 to perform processing. The storage device 102 includes a volatile storage device (not shown) such as a random access memory (RAM) that can temporarily store data, and a nonvolatile auxiliary storage device such as a hard disk and a flash memory that can store data for a long time (not shown). The clocking device 103 is a device such as a timer that performs clocking when used for judgment by the control processing device 101, or for other purposes.

Here, it is presumed that the control processing device 101 includes, for example, a microcomputer having a control arithmetic processing device such as a CPU (Central Processing Unit). The storage device 102 has data in which the processing procedure performed by the control processing device 101 is programmed. The control arithmetic processing unit executes processing based on the programmed data, whereby control is realized. However, this is not restrictive, and each device may be a dedicated device (hardware).

Next, operation of each device in the air-conditioning apparatus 1 of Embodiment 1 will be illustrated based on the flow of a refrigerant. First, the cooling operation will be described. A high-temperature and high-pressure gas refrigerant compressed by and discharged from the compressor 10 passes through the four-way valve 20 and flows into the outdoor heat exchanger 30. The refrigerant (liquid refrigerant) that has been condensed and liquefied by passing through the outdoor heat exchanger 30 and transferring heat with outdoor air, passes through the first expansion device 40, the refrigerant container 50, and the second expansion device 60. At this time, the refrigerant is depressurized by the first expansion device 40 and the second expansion device 60. The refrigerant that is turned to be in a gas-liquid two-phase state after being depressurized by the first expansion device 40 and the second expansion device 60 passes through the first connection pipe 80 and the indoor heat exchanger 70. In the indoor heat exchanger 70, for example, the refrigerant (gas refrigerant) evaporated and gasified by exchanging heat with the air in the air-conditioned space passes through the second connection pipe 90 and the four-way valve 20 and is again sucked by the compressor 10. The refrigerant of the air-conditioning apparatus 1 circulates in a manner mentioned above and performs air conditioning related to cooling.

Next, operation of each device in the heating operation will be described based on the flow of the refrigerant. The high-temperature and high-pressure gas refrigerant compressed by and discharged from the compressor 10 passes through the four-way valve 20 and the second connection pipe 90, and flows into the indoor heat exchanger 70. While passing through the indoor heat exchanger 70, the gas refrigerant is condensed and liquefied by transferring heat with, for example, air in the air-conditioned space. The condensed and liquefied refrigerant passes through the first connection pipe 80, the second expansion device 60, the refrigerant container 50, and the first expansion device 40. At this time, the refrigerant is depressurized by the second expansion device 60 and the first expansion device 40. The refrigerant depressurized by the second expansion device 60 and the first expansion device 40 and is in a gas-liquid two-phase state passes through the outdoor heat exchanger 30. In the outdoor heat exchanger 30, refrigerant (gas refrigerant) evaporated and gasified by exchanging heat with outdoor air passes through the four-way valve 20 and is sucked again by the compressor 10. The refrigerant of the air-conditioning apparatus 1 circulates as mentioned above to perform air conditioning related to heating.

Figure 2:
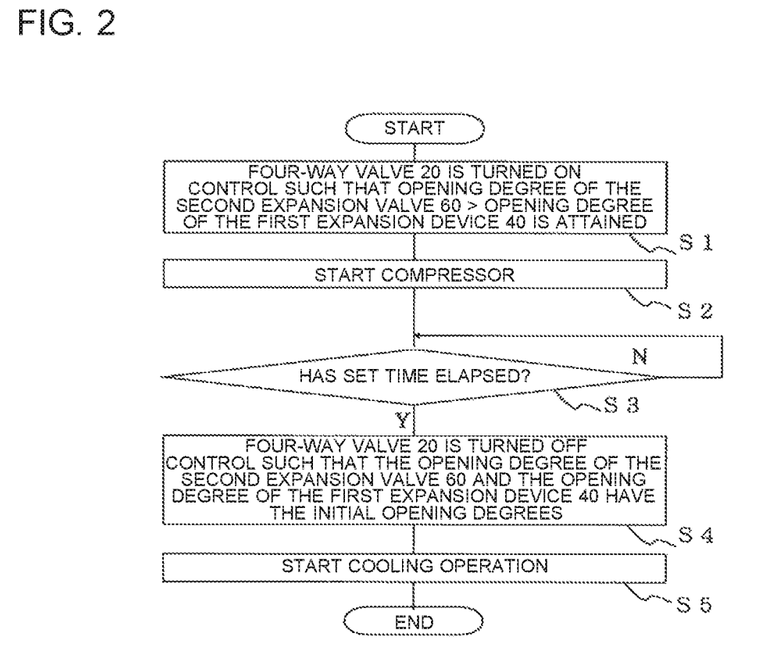
FIG. 2 is a diagram of a flow chart illustrating procedures of control processing performed by the controller 100 in the air-conditioning apparatus 1 according to Embodiment 1 of the present disclosure.
Figure 3:
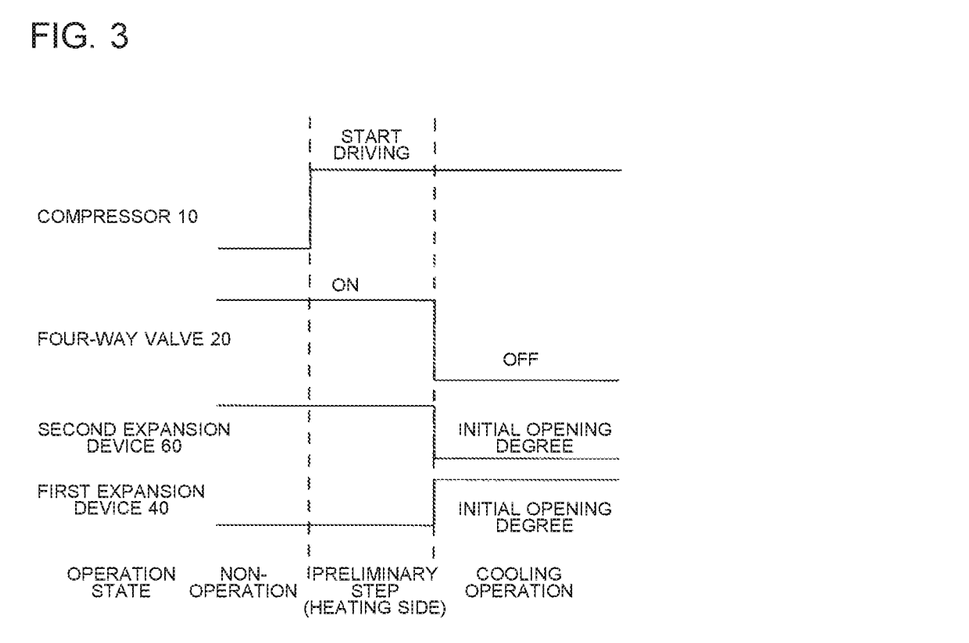
FIG. 3 is a diagram illustrating a time chart of signals sent by the controller 100 according to Embodiment 1 of the present disclosure to the devices of air-conditioning apparatus 1.

FIG. 2 is a diagram of a flow chart illustrating procedures of control processing performed by the controller 100 in the air-conditioning apparatus 1 according to Embodiment 1 of the present disclosure. FIG. 3 is a diagram illustrating a time chart of the signals sent by the controller 100 according to Embodiment 1 of the present disclosure to the devices of the air-conditioning apparatus 1. With reference to FIG. 2 and FIG. 3, the operation during cooling operation of the air-conditioning apparatus 1 according to Embodiment 1 will be explained.

In the cooling operation, when the compressor 10 is driven from the non-operation state, as the processing of a preliminary step, the controller 100 turns on the four-way valve 20 and switches the flow passage to the heating flow passage. Further, the opening degree of each of the expansion devices is controlled such that the opening degree of the second expansion device 60 is larger than the opening degree of the first expansion device 40 (step S1). Here, regarding the opening degree of the second expansion device 60 and the opening degree of the first expansion device 40, for example, the opening degree of the first expansion device 40 is 50 pulses, relative to 480 pulses of the opening degree of the second expansion device 60. However, the relationship between the opening degrees is not limited to this example.

Then, the compressor 10 is started (step S2). The compressor 10 sucks the refrigerant from a port of the outdoor heat exchanger 30, depressurizes, and discharges the sucked refrigerant. The refrigerant in the second connection pipe 90 and the refrigerant discharged from the compressor 10 are sent to the indoor heat exchanger 70. Part or all of the refrigerant sent to the indoor heat exchanger 70 is condensed. Since the inner volume of the indoor heat exchanger 70 is small and the opening degree of the second expansion device 60 is larger than the opening degree of the first expansion device 40, the condensed refrigerant moves through the indoor heat exchanger 70 and a large amount of the refrigerant is retained in the first connection pipe 80 and the refrigerant container 50.

Next, the controller 100 determines whether or not the set time has elapsed since the compressor 10 is started (step S3). The set time is set in advance as follows. Specifically, a period of time for which the discharge pressure that is the highest in the refrigerant circuit reaches a design pressure in the refrigerant circuit is presumed to be the longest, and the set time is set in advance so as to be equal to or shorter than said period of time. The set time is, for example, about one minute. Here, the discharge pressure and a set pressure can be compared for the determination. However, if determination is made by comparing the set pressure with the discharge pressure of the compressor 10, that is still unstable immediately after the start, immediate stop of the compressor 10 or other troubles may occur. Therefore, in order to prevent occurrence of such troubles, determination by the set time is performed. When it is determined that the set time has elapsed, the controller 100 turns off the four-way valve 20 and switches the flow passage to the cooling flow passage. The opening degree of the first expansion device 40 and the opening degree of the second expansion device 60 are controlled so as to be the initially-set opening degrees for the cooling operation (step S4). Then, the cooling operation is started (step S5).

As described above, according to Embodiment 1, when the cooling operation is performed in the air-conditioning apparatus 1 in which the inner volume of the indoor heat exchanger 70 is smaller than the inner volume of the outdoor heat exchanger 30, the controller 100 turns on the four-way valve 20 as the preliminary step to allow the flow passage to be the heating flow passage. Further, the compressor 10 is driven for the set time after making the opening degree of the second expansion device 60 larger than the opening degree of the first expansion device 40. Therefore, the refrigerant in the outdoor heat exchanger 30 and the second connection pipe 90 moves, and the amount of the refrigerant remaining in the indoor heat exchanger 70, the first connection pipe 80, and the refrigerant container 50 increases. In this state, the four-way valve 20 is turned off to allow the flow passage to be the cooling flow passage to start the cooling operation, whereby the refrigerant remaining in the first connection pipe 80 and the refrigerant container 50 is supplied to the indoor heat exchanger 70 even if the refrigerant moves slowly from the outdoor heat exchanger 30 having a large inner volume in the transient period from the start of the operation. Therefore, it is possible to eliminate shortage of refrigerant in the indoor heat exchanger 70 at the time of starting the cooling operation. Accordingly, it is possible to suppress a decrease in the suction pressure of the refrigerant at the suction pressure of the compressor 10, and it is possible to improve the reliability of the air-conditioning apparatus 1.

Embodiment 2

Figure 4:
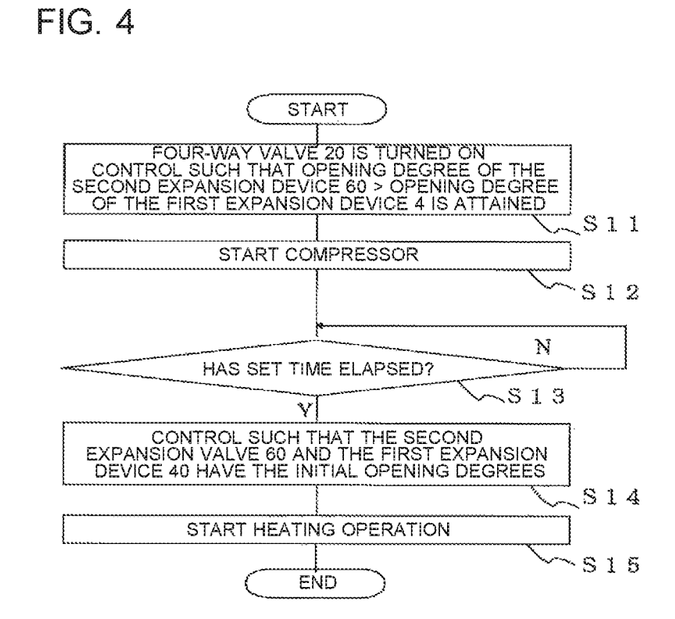
FIG. 4 is a diagram of a flow chart illustrating procedures of control processing performed by the controller 100 in the air-conditioning apparatus 1 according to the Embodiment 2 of the present disclosure.
Figure 5:
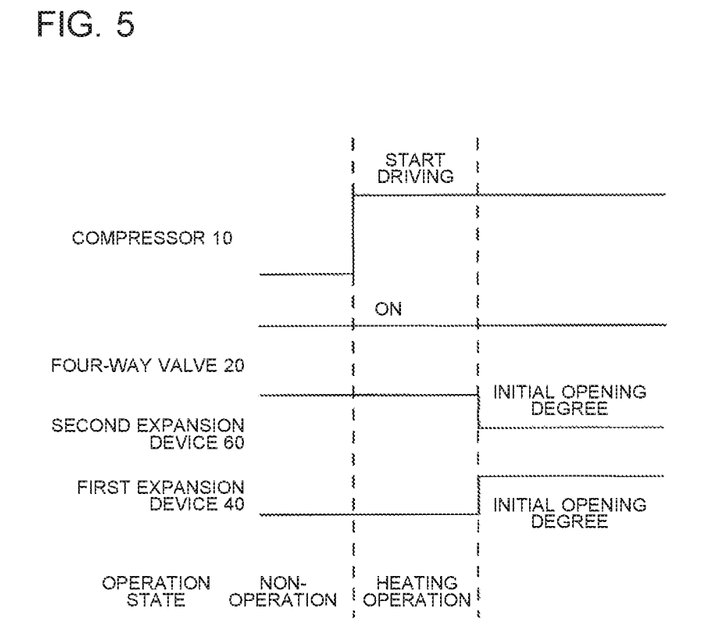
FIG. 5 is a diagram illustrating a time chart of signals sent by the controller 100 according to Embodiment 2 of the present disclosure to the devices of the air-conditioning apparatus 1.

FIG. 4 is a diagram of a flow chart illustrating procedures of control processing performed by the controller 100 in the air-conditioning apparatus 1 according to Embodiment 2. FIG. 5 is a diagram illustrating a time chart of signals sent to the devices of the air-conditioning apparatus 1 by the controller 100 according to Embodiment 2. The operation of the air-conditioning apparatus 1 according to Embodiment 2 during the heating operation will be described with reference to FIGS. 4 and 5. Here, the device configuration of the air-conditioning apparatus 1 and the relationship between the inner volume of the outdoor heat exchanger 30 and the inner volume of the indoor heat exchanger 70 in Embodiment 2 are the same as those described in Embodiment 1.

In the heating operation, when the compressor 10 is driven from the non-operation state, the controller 100 turns on the four-way valve 20 to allow the flow passage to be the heating flow passage. The opening degrees of the respective expansion devices are controlled such that the opening degree of the second expansion device 60 is larger than the opening degree of the first expansion device 40 (step S11). The relationship between the opening degree of the second expansion device 60 and the opening degree of the first expansion device 40 is the same as that described in Embodiment 1.

Then, the compressor 10 is started (step S12). The compressor 10 sucks the refrigerant from a pipe near the outdoor heat exchanger 30, compresses, and discharges the refrigerant. The refrigerant in the second connection pipe 90 and the refrigerant discharged from the compressor 10 are sent to the indoor heat exchanger 70. Part or all of the refrigerant sent to the indoor heat exchanger 70 is condensed. Since the inner volume of the indoor heat exchanger 70 is small and the opening degree of the second expansion device 60 is larger than the opening degree of the first expansion device 40, the condensed refrigerant moves from the indoor heat exchanger 70 to the first connection pipe 80 and the refrigerant container 50.

Next, the controller 100 determines whether or not the set time has elapsed since the compressor 10 is started (step S13). When the controller 100 determines that the set time has elapsed, the controller 100 controls the opening degree of the first expansion device 40 and the opening degree of the second expansion device 60 such that they are the initially-set opening degrees for the heating operation (step S14). Then, the heating operation is started (step S15).

As described above, according to Embodiment 2, when the heating operation is performed in the air-conditioning apparatus 1 in which the inner volume of the indoor heat exchanger 70<the inner volume of the outdoor heat exchanger 30, the controller 100 allows the opening degree of the second expansion device 60 to be larger than the opening degree of the first expansion device 40. Then, the compressor 10 is driven until the set time elapses. Therefore, the refrigerant in the indoor heat exchanger 70 can be transferred to the first connection pipe 80 and the refrigerant container 50. Thereafter, by performing the heating operation by setting the opening degree of the second expansion device 60 and the opening degree of the first expansion device 40 to the initial opening degrees for the heating operation, it is possible to prevent the inside of the indoor heat exchanger 70 from being overfilled with the refrigerant in the transient period at the start of the operation. Therefore, it is possible to suppress an excessive increase in the discharge pressure of the refrigerant on the discharge side of the compressor 10, and it is possible to improve the reliability of the air-conditioning apparatus 1.

Embodiment 3

Figure 6:
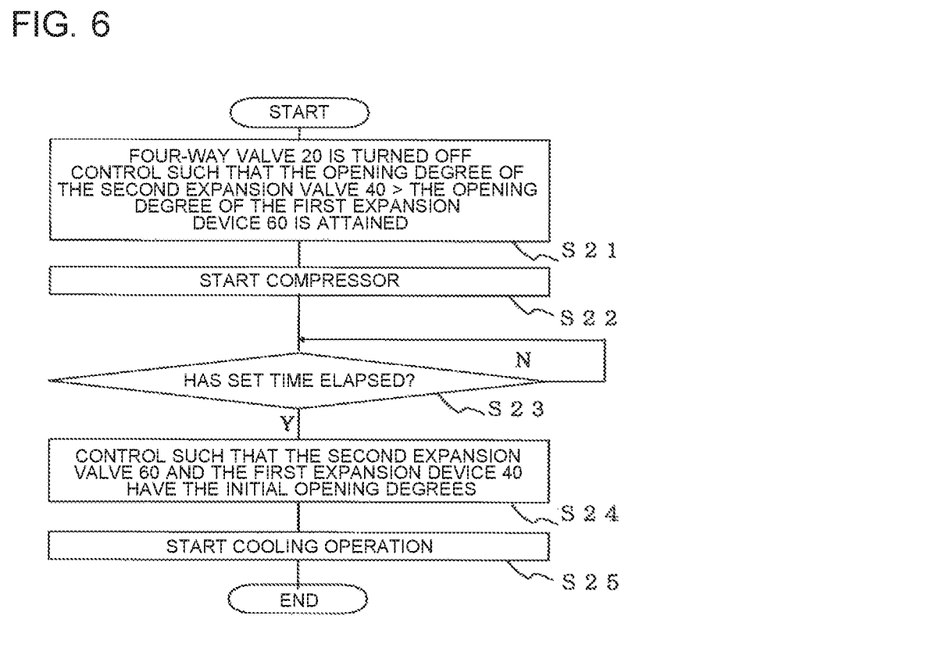
FIG. 6 is a diagram of a flow chart illustrating procedures of control processing performed by the controller 100 in the air-conditioning apparatus 1 according to Embodiment 3 of the present disclosure.
Figure 7:
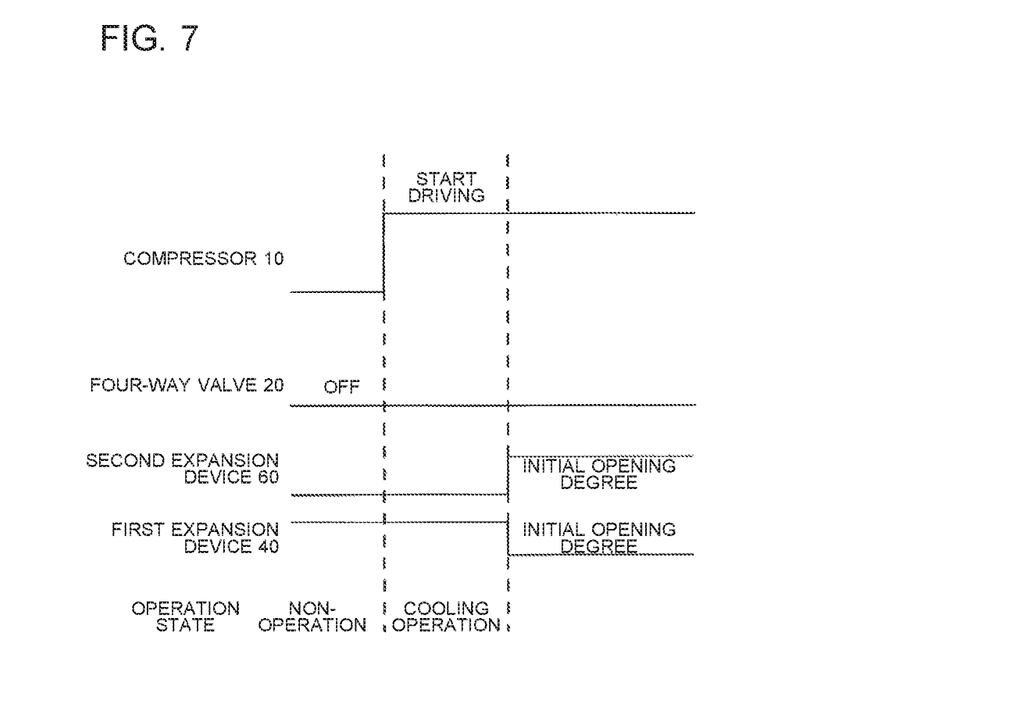
FIG. 7 is a diagram illustrating a time chart of signals sent by the controller 100 according to Embodiment 3 of the present disclosure to the devices of the air-conditioning apparatus 1.

FIG. 6 is a diagram of a flow chart illustrating procedures of control processing performed by the controller 100 in the air-conditioning apparatus 1 according to Embodiment 3. FIG. 7 is a diagram of a time chart of signals sent by the controller 100 according to Embodiment 3 to the devices of the air-conditioning apparatus 1. The operation of the air-conditioning apparatus 1 according to Embodiment 3 during the cooling operation will be described with reference to FIGS. 6 and 7. Here, the device configuration of the air-conditioning apparatus 1 in Embodiment 3 is the same as that described in Embodiment 1. On the other hand, regarding the relationship between the inner volume of the outdoor heat exchanger 30 and the inner volume of the indoor heat exchanger 70 of the air-conditioning apparatus 1 in Embodiment 3, the inner volume of the indoor heat exchanger 70 is larger than the inner volume of the outdoor heat exchanger 30 (inner volume of the outdoor heat exchanger 30<inner volume of the indoor heat exchanger 70). Specifically, for example, the relationship is 1.0<inner volume of the indoor heat exchanger 70/inner volume of the outdoor heat exchanger 30≤3.0.

In the cooling operation, when the compressor 10 is driven from the non-operation state, the controller 100 turns off the four-way valve 20 to allow the flow passage to be the cooling flow passage, and controls the opening degrees of the respective expansion devices such that the opening degree of the first expansion device 40 is larger than the opening degree of the second expansion device 60 (step S21). Here, regarding the opening degree of the first expansion device 40 and the opening degree of the second expansion device 60, the opening degree of the first expansion device 40 is 480 pulses and the opening degree of the second expansion device 60 is 50 pulses, for example. However, the relationship of the opening degrees is not limited to this example.

Then, the compressor 10 is started (step S22). The compressor 10 sucks the refrigerant from a pipe near the indoor heat exchanger 70, compresses, and discharges the refrigerant. The refrigerant discharged from the compressor 10 is sent to the outdoor heat exchanger 30. Part or all of the refrigerant sent to the outdoor heat exchanger 30 is condensed. Since the inner volume of the outdoor heat exchanger 30 is small and the opening degree of the first expansion device 40 is larger than the opening degree of the second expansion device 60, the condensed refrigerant moves from the outdoor heat exchanger 30 to the refrigerant container 50 and is stored in the refrigerant container 50.

Next, the controller 100 determines whether or not the set time has elapsed since the compressor 10 is started (step S23). When it is determined that the set time has elapsed, the controller 100 controls the opening degree of the first expansion device 40 and the opening degree of the second expansion device 60 such that they are the initially-set opening degrees for the cooling operation (step S24). Then, the cooling operation is started (step S25).

As described above, according to Embodiment 3, when the cooling operation is performed in the air-conditioning apparatus 1 in which the inner volume of the outdoor heat exchanger 30<the inner volume of the indoor heat exchanger 70, the controller 100 allows the opening degree of the first expansion device 40 to be larger than the opening degree of the second expansion device 60, and the compressor 10 is allowed to be driven for the set time. Therefore, the refrigerant in the outdoor heat exchanger 30 can move to the refrigerant container 50. Thereafter, by starting the cooling operation by setting the opening degree of the first expansion device 40 and the opening degree of the second expansion device 60 to the initial opening degrees for the cooling operation, it is possible to prevent the inside of the indoor heat exchanger 70 from being overfilled with the refrigerant in the transient period at the start of the operation. Therefore, it is possible to suppress an excessive increase in the discharge pressure of the refrigerant on the discharge side of the compressor 10, and it is possible to improve the reliability of the air-conditioning apparatus 1.

Embodiment 4

Figure 8:
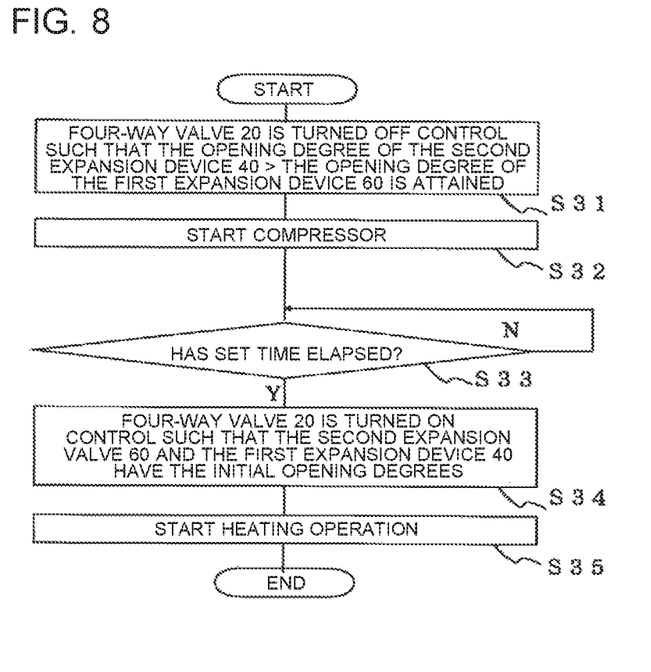
FIG. 8 is a diagram of a flow chart illustrating procedures of control processing performed by the controller 100 in the air-conditioning apparatus 1 according to Embodiment 4 of the present disclosure.
Figure 9:
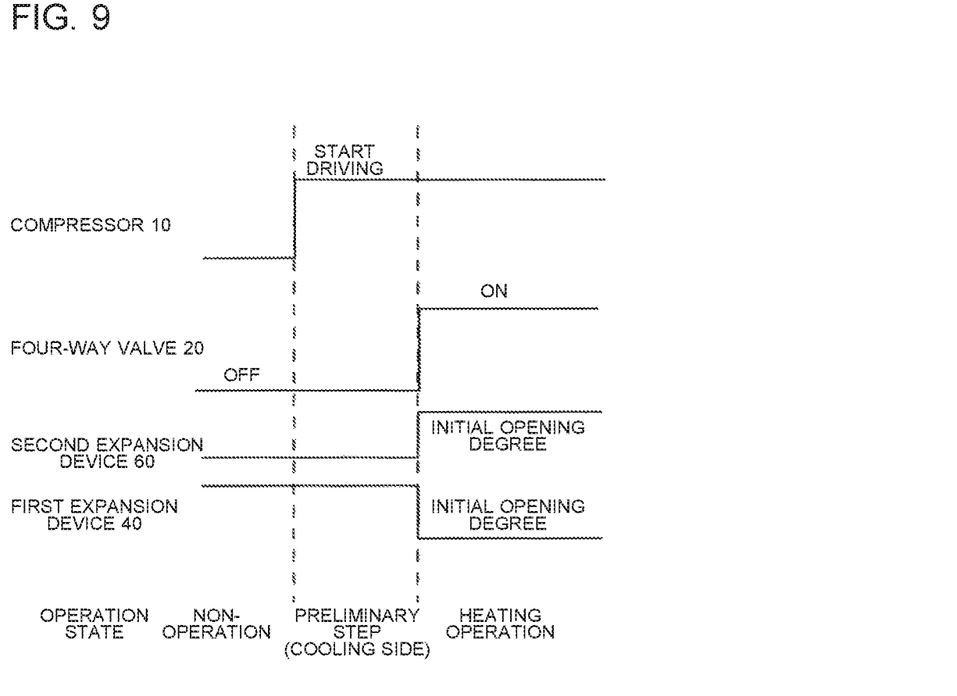
FIG. 9 is a diagram illustrating a time chart of signals sent by the controller 100 according to Embodiment 4 of the present disclosure to the devices of air-conditioning apparatus 1.

FIG. 8 is a diagram of a flow chart illustrating procedures of control processing performed by the controller 100 in the air-conditioning apparatus 1 according to Embodiment 4. FIG. 9 is a diagram illustrating a time chart of signals sent by the controller 100 according to Embodiment 4 to the devices of the air-conditioning apparatus 1. The operation of the air-conditioning apparatus 1 according to Embodiment 4 during the heating operation will be described with reference to FIGS. 8 and 9. Here, the device configuration of the air-conditioning apparatus 1 in Embodiment 4 is the same as that described in Embodiment 1. The relationship of the inner volume between the outdoor heat exchanger 30 and the inner volume of the indoor heat exchanger 70 is the same as that described in Embodiment 3.

In the heating operation, when the compressor 10 is driven from the non-operation state, the controller 100 turns off the four-way valve 20 as the processing in the preliminary step, and switches the flow passage to the cooling flow passage. The opening degrees of the respective expansion devices are controlled such that the opening degree of the first expansion device 40 is larger than the opening degree of the second expansion device 60 (step S31). The relationship between the opening degree of the second expansion device 60 and the opening degree of the first expansion device 40 is the same as that described in Embodiment 3.

Then, the compressor 10 is started (step S32). The compressor 10 sucks the refrigerant from the pipe near the indoor heat exchanger 70 and the second connection pipe 90, compresses and discharges the refrigerant. The refrigerant discharged from the compressor 10 is sent to the outdoor heat exchanger 30. Part or all of the refrigerant sent to the outdoor heat exchanger 50 is condensed. Since the inner volume of the outdoor heat exchanger 50 is small and the opening degree of the first expansion device 40 is larger than the opening degree of the second expansion device 60, the condensed refrigerant moves from the outdoor heat exchanger 50 to the refrigerant container 50, and is stored in the refrigerant container 50.

Next, the controller 100 determines whether or not the set time has elapsed since the compressor 10 is started (step S33). When it is determined that the set time has elapsed, the controller 100 turns on the four-way valve 20 and switches the flow passage to the heating flow passage. Further, the controller 100 controls the opening degree of the first expansion device 40 and the opening degree of the second expansion device 60 such that they are the initially-set opening degrees for the heating operation (step S34). Then, the heating operation is started (step S35).

As described above, according to Embodiment 4, when the heating operation is performed in the air-conditioning apparatus 1 in which the inner volume of the outdoor heat exchanger 30<the inner volume of the indoor heat exchanger 70, the controller 100 turns off the four-way valve 20, to thereby allow the flow passage to be the cooling flow passage. Further, the compressor 10 is driven for the set time after allowing the opening degree of the first expansion device 40 to be larger than the opening degree of the second expansion device 60. Therefore, the refrigerant in the indoor heat exchanger 70 and the second connection pipe 90 moves, and the amount of the refrigerant remaining in the refrigerant container 50 increases. In this state, the four-way valve 20 is turned off to allow the flow passage to be the heating flow passage, and the heating operation is started, whereby, even if the refrigerant moves slowly from the indoor heat exchanger 70 having a large inner volume during a transient period at the start of the operation, the refrigerant remaining in the refrigerant container 50 is supplied to the indoor heat exchanger 70. It is possible to eliminate shortage of refrigerant in the indoor heat exchanger 70 at the time of starting the heating operation. Therefore, it is possible to suppress a decrease in the suction pressure of the refrigerant on the suction side of the compressor 10, whereby the reliability of the air-conditioning apparatus 1 can be improved.

Embodiment 5

Figure 10:
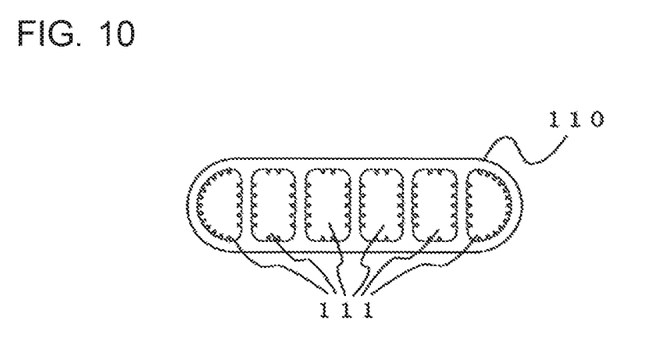
FIG. 10 is a diagram illustrating a configuration of the heat transfer tube in the heat exchanger according to Embodiment 5 of the present disclosure.

FIG. 10 is a diagram illustrating a configuration of the heat transfer tube in the heat exchanger according to Embodiment 5. Although not specifically mentioned in Embodiments 1 to 4 given above, the heat transfer tube included in at least one heat exchanger of the outdoor heat exchanger 30 and the indoor heat exchanger 70 of the air-conditioning apparatus 1 may be a multi-hole flat tube 110.

As shown in FIG. 10, the multi-hole flat tube 110 has a plurality of holes serving as heat transfer tube flow passages 111. The inner volume of each of the plurality of heat transfer tube flow passages 111 is smaller than the inner volume of a round tube. For this reason, shortage of refrigerant and overfilling of the refrigerant in the heat exchanger tend to occur. Therefore, the operation of the air-conditioning apparatus 1 in Embodiments 1 to 4 described above is particularly advantageous when the air-conditioning apparatus 1 is provided with the heat exchanger having the multi-hole flat tube 110.

Embodiment 6

Figure 11:
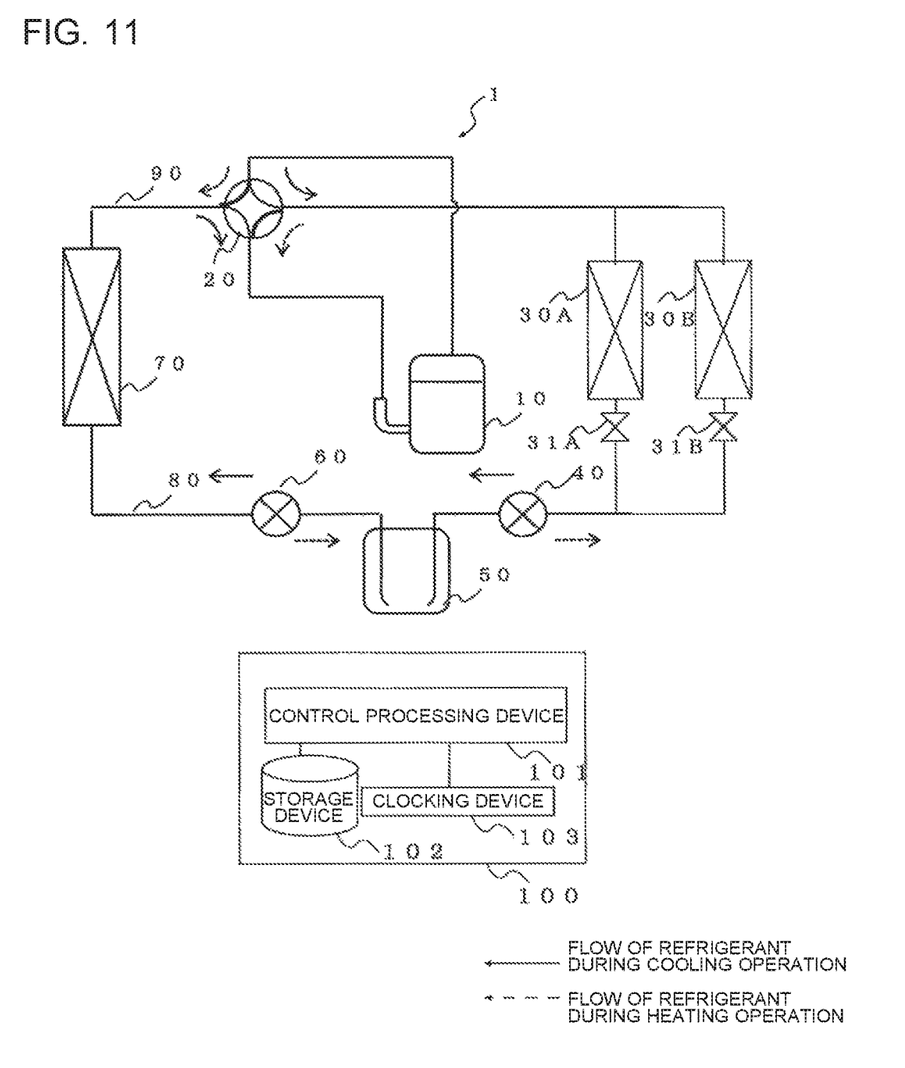
FIG. 11 is a diagram illustrating a configuration of the air-conditioning apparatus 1 according to Embodiment 6 of the present disclosure.

FIG. 11 is a diagram illustrating the configuration of the air-conditioning apparatus 1 according to Embodiment 6. The air-conditioning apparatus 1 in Embodiment 6 includes an outdoor heat exchanger 30A and an outdoor heat exchanger 30B which are connected in parallel in the refrigerant circuit. The outdoor heat exchanger 30A and the outdoor heat exchanger 30B have an on-off valve 31A and an on-off valve 31B, respectively. The controller 100 opens and closes the on-off valve 31A and the on-off valve 31B to control the flow of the refrigerant in the outdoor heat exchanger 30A and the outdoor heat exchanger 30B.

Here, in the air-conditioning apparatus 1 shown in FIG. 11, if the refrigerant can pass through both the outdoor heat exchanger 30A and the outdoor heat exchanger 30B, the inner volumes of the outdoor heat exchanger 30A and the outdoor heat exchanger 30B are greater than the inner volume of the indoor heat exchanger 70. If the refrigerant can pass through one of the outdoor heat exchanger 30A and the outdoor heat exchanger 30B, the inner volume of the outdoor heat exchanger 30A is smaller than the inner volume of the indoor heat exchanger 70. Therefore, the controller 100 can perform the control processing described in Embodiments 1 to 4. This can also be applied to, for example, a case where plural indoor heat exchangers 70 are connected in parallel relative to the refrigerant circuit.

The invention claimed is:

1. An air-conditioning apparatus comprising a refrigerant circuit in which a compressor, a flow passage switching device, an outdoor heat exchanger, an indoor heat exchanger, a refrigerant container, a first expansion device and a second expansion device are connected by pipes;
    the compressor compressing and discharging sucked refrigerant,
    the flow passage switching device switching a flow passage to a cooling flow passage during cooling operation and to a heating flow passage during heating operation,
    the outdoor heat exchanger being located outside of a room and causing heat exchange to be performed with refrigerant,
    the indoor heat exchanger being located inside of a room and causing heat exchange to be performed between air in an air-conditioned space and the refrigerant,
    the refrigerant container storing excessive refrigerant,
    the first expansion device depressurizing the refrigerant between the outdoor heat exchanger and the refrigerant container, and
    the second expansion device depressurizing the refrigerant between the indoor heat exchanger and the refrigerant container,
    wherein the indoor heat exchanger and the outdoor heat exchanger have inner volumes satisfying a relationship of an inner volume of the indoor heat exchanger<an inner volume of the outdoor heat exchanger, and
    the air-conditioning apparatus further comprises a controller which is configured to, when performing cooling operation, perform control so as to allow the flow passage switching device to switch the flow passage to the heating flow passage and allow an opening degree of the second expansion device to be larger than an opening degree of the first expansion device, and start the compressor, and when a judgment is made that a set time that is set in advance has elapsed from the start of the compressor, perform control so as to allow the opening degree of the first expansion device and the opening degree of the second expansion device to be initial opening degrees for the cooling operation.

2. The air-conditioning apparatus of claim 1, wherein, when performing heating operation, the controller performs control so as to allow the opening degree of the second expansion device to be larger than the opening degree of the first expansion device, and starts the compressor, and when a judgment is made that the set time has elapsed from the start of the compressor, performs control so as to allow the opening degrees of the second expansion device and the first expansion device to be initial opening degrees for the heating operation.

3. An air-conditioning apparatus comprising a refrigerant circuit in which a compressor, a flow passage switching device, an outdoor heat exchanger, an indoor heat exchanger, a refrigerant container, a first expansion device and a second expansion device are connected by pipes;
    the compressor compressing and discharging sucked refrigerant,
    the flow passage switching device switching a flow passage to a cooling flow passage during cooling operation and a heating flow passage during heating operation,
    the outdoor heat exchanger being located outside of a room and causing heat exchange to be performed with refrigerant,
    the indoor heat exchanger being located inside of a room and causing heat exchange to be performed between air in an air-conditioned space and the refrigerant,
    the refrigerant container storing excessive refrigerant,
    the first expansion device depressurizing the refrigerant between the outdoor heat exchanger and the refrigerant container, and the second expansion device depressurizing the refrigerant between the indoor heat exchanger and the refrigerant container, wherein the indoor heat exchanger and the outdoor heat exchanger have inner volumes satisfying a relationship of an inner volume of the indoor heat exchanger>an inner volume of the outdoor heat exchanger, and the air-conditioning apparatus further comprises a controller which is configured to, when performing heating operation, perform control so as to allow the flow passage switching device to switch the flow passage to the cooling flow passage and allow an opening degree of the first expansion device to be larger than an opening degree of the second expansion device, and start the compressor, and when a judgment is made that a set time that is set in advance has elapsed from the start of the compressor, perform control so as to allow the flow passage switching device to switch the flow passage to the heating flow passage and an opening degree of the first expansion device and an opening degree of the second expansion device to be initial opening degrees for the heating operation.

4. The air-conditioning apparatus of claim 3, wherein, when performing cooling operation, the controller performs control so as to allow the opening degree of the first expansion device to be larger than the opening degree of the second expansion device, and starts the compressor, and when a judgement is made that the set time has elapsed from the start of the compressor, performs control so as to allow the opening degree of the first expansion device and the opening degree of the second expansion device to be initial opening degrees for the cooling operation.

5. The air-conditioning apparatus of claim 1, wherein the set time is set to a time period that is equal to or shorter than a time period during which a discharge pressure of the refrigerant discharged from the compressor reaches a design pressure that is designed in the refrigerant circuit.

6. The air-conditioning apparatus of claim 1, wherein at least one of the indoor heat exchanger and the outdoor heat exchanger is a heat exchanger having multi-hole flat tubes.

* * * * *